June 27, 1950  J. STEPHEN  2,513,117
TORSION BEARING FIFTH WHEEL

Filed April 3, 1947  2 Sheets-Sheet 1

INVENTOR.
James Stephen
BY Robert Cobb

June 27, 1950  J. STEPHEN  2,513,117
TORSION BEARING FIFTH WHEEL
Filed April 3, 1947  2 Sheets-Sheet 2
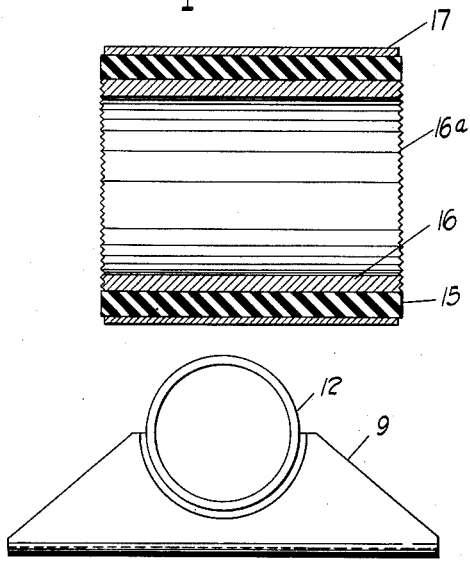
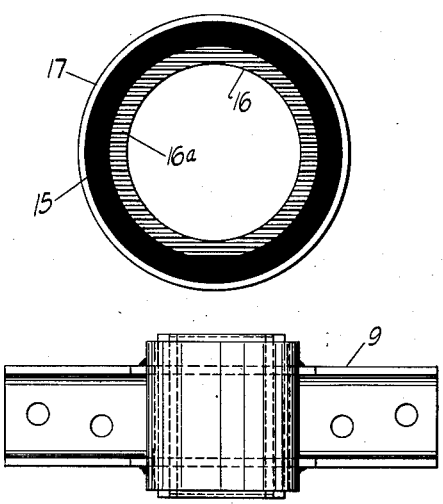
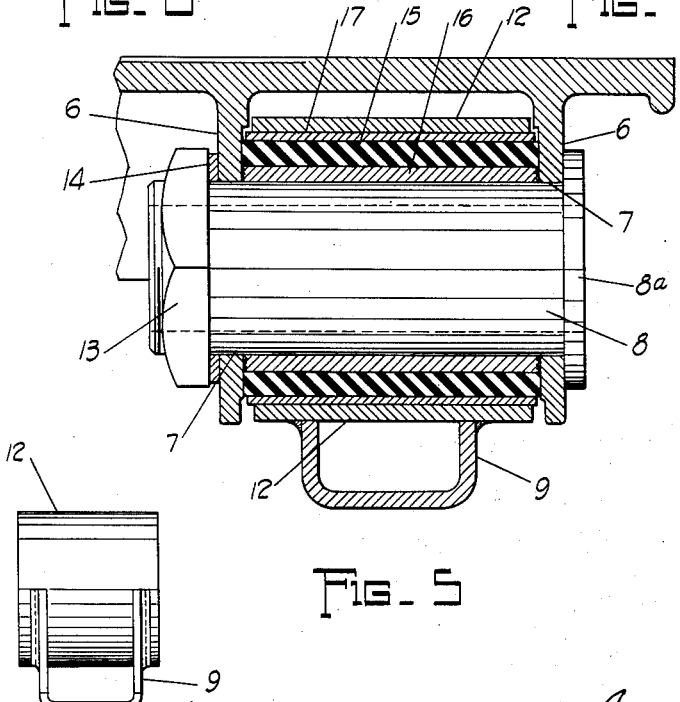
INVENTOR.
James Stephen
BY Robt H Cobb Patented June 27, 1950

2,513,117

UNITED STATES PATENT OFFICE 2,513,117

TORSION BEARING FIFTH WHEEL

James Stephen, Edgerton, Wis., assignor to Highway Trailer Co., Edgerton, Wis., a corporation Application April 3, 1947, Serial No. 739,113

1 Claim. (Cl. 280—33.05)

My present invention relates to the construction of fifth wheels such as at the present time commonly employed for automatic coupling together of a semi-trailer vehicle with the tractor vehicle by which it is to be moved for transit purposes.

The fifth wheels of the type of my invention are generally pivotally mounted upon the rear end of the tractor vehicle. They comprise a body of so-called split formation including rearwardly diverging arms for guiding the king pin of the trailer vehicle into the socket of the fifth wheel where the king pin is engaged by automatic coupling devices for establishing the operating connection between the tractor and the front end of the semi-trailer vehicle.

For a proper coupling of the two vehicle units above referred to it is necessary that the rear split portion of the fifth wheel on the tractor shall incline downwardly so that the front end of the trailer vehicle may ride up the incline as its king pin moves in the space between the rearward guide extensions of the fifth wheel. The above action of course lifts the front end of the semi-trailer from its usual front wheel supports previously carrying the load of the front end of said trailer, and when the king pin has reached the socket of the fifth wheel the latter will be tilted into a substantially horizontal position in which it is fully coupled to the king pin. The fifth wheel in ordinary practice is pivotally mounted therefore upon the rear end of the tractor so that the necessary rocking movement of the fifth wheel to enable it to be shifted from its downwardly and rearwardly inclined position, to its horizontal position coupled with the trailer king pin, may be obtained. Moreover the pivotal connection between the fifth wheel and the tractor vehicle is also necessary so that during the travel of the trailer in connection with the tractor a certain amount of forward and rearward tilting pivotal movement of the fifth wheel may be had in order to accommodate for inequality in ground level over which the combined tractor and trailer vehicle moves in transit.

All the foregoing is commonly known to those versed in the art, and it is also well known that in order to insure that the fifth wheel at its rear end will incline downwardly as a normal position when uncoupled from the trailer vehicle, said fifth wheel is usually overweighted at the rear split portion thereof by use of ample metal to provide the overweight function. If the wheel should not be inclined downwardly in the coupling operation between the tractor backing into the trailer for connection therewith there is liability of breakage or damage of the vehicle, for obvious reasons, and especially should the fifth wheel be in a horizontal position substantially, as the tractor backs into the semi-trailer at the front end of the latter.

Heretofore in the art also it has been proposed to insure the downward inclination of the rear end of a somewhat balanced pivotally mounted fifth wheel of the type I referred to, by using springs of the coil type connecting the rear end portion of the fifth wheel, or a portion at the rear of the pivotal connections of said wheel, to the tractor, which springs tend to forcibly move downwardly the rear split portion of the fifth wheel, to maintain it in an inclined position such as heretofore described, preliminary to coupling of the two vehicle units.

A primary object of my present invention having in view the foregoing explanation of the ordinary operation and use of automatic coupling fifth wheels, has been to provide a fifth wheel mounting construction of a highly simplified nature whereby the rear end of the fifth wheel is normally biassed to move in a direction downwardly and maintain such position for the purpose hereinbefore set forth.

Another object of my invention has been to design pivotal supporting means for the fifth wheel to carry the same on the rear end of the tractor, which supporting means involves the employment of novel torsion units especially designed for obtaining the results of normally biassing the rear end or king pin receiving portion of the fifth wheel in a downward direction, to avoid liability of said fifth wheel assuming a substantially horizontal position at the time the coupling operation of the tractor vehicle with the semi-trailer vehicle is to be effected.

Still a further object of my invention has been to employ a type of torsion bearing or unit such as above referred to, utilizing a special construction of torsion rubber sleeve, peculiarly united to mating pivot members between the fifth wheel and the chassis of the tractor which carries the same, the rubber sleeve torsion members providing incompressible connections between the fifth wheel and the said chassis, but affording the necessary and desired torsion function, by which the fifth wheel is normally maintained in a position inclining downwardly at its rear end, when uncoupled from the trailer vehicle.

Still another object of my invention has been to utilize the above features involving the torsion unit pivot mounting means, of such a specially designed construction, as to be readily assembled and quickly preliminarily adjusted for the performance of the functions referred to.

In the accompanying drawings I have illustrated one embodiment of my invention which is the preferred form thereof, and this specific embodiment will be described in detail hereinafter. In the said drawings:

Figure 1 is a longitudinal sectional view of a fifth wheel embodying my invention with the means for mounting the same upon the chassis of a tractor vehicle, the view taken on line 2—2 of Figure 2 and showing certain of the coupling parts and the formation of the body of the wheel, and dotted lines illustrating the position of the fifth wheel normally when the tractor vehicle carrying the same is not connected with the semi-trailer vehicle.

Figure 3 is a longitudinal sectional view through the torsion bushing unit showing the rubber torsion bushing or sleeve surrounded by the metal containing sleeves united thereto, the view bringing out the serrated formation of the inner metal sleeve, the purpose of which will be more fully brought out later.

Figure 4 is a transverse sectional view taken through the torsion bushing unit.

Figure 5 is a vertical sectional view, of fragmentary form taken about on the line 5—5 of Figure 2.

Figure 6 is a side view of one of the chassis attached bearing brackets for supporting one of the pivot bearings at a side of the fifth wheel.

Figures 7 and 8 are end and top plan views respectively of the supporting bracket shown in Figure 6.

Figure 1:
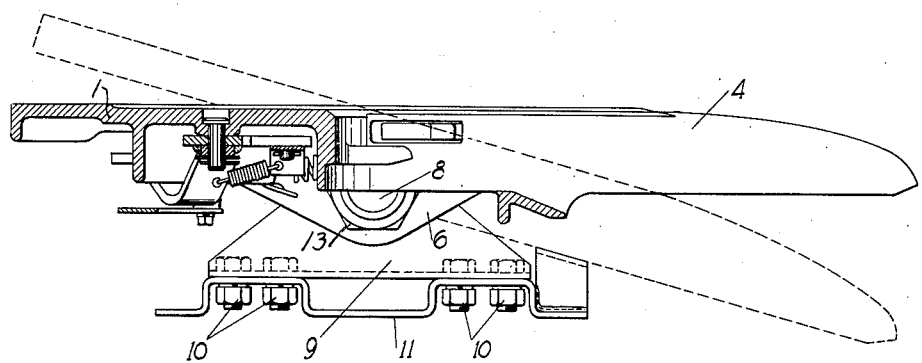
Figure 2:
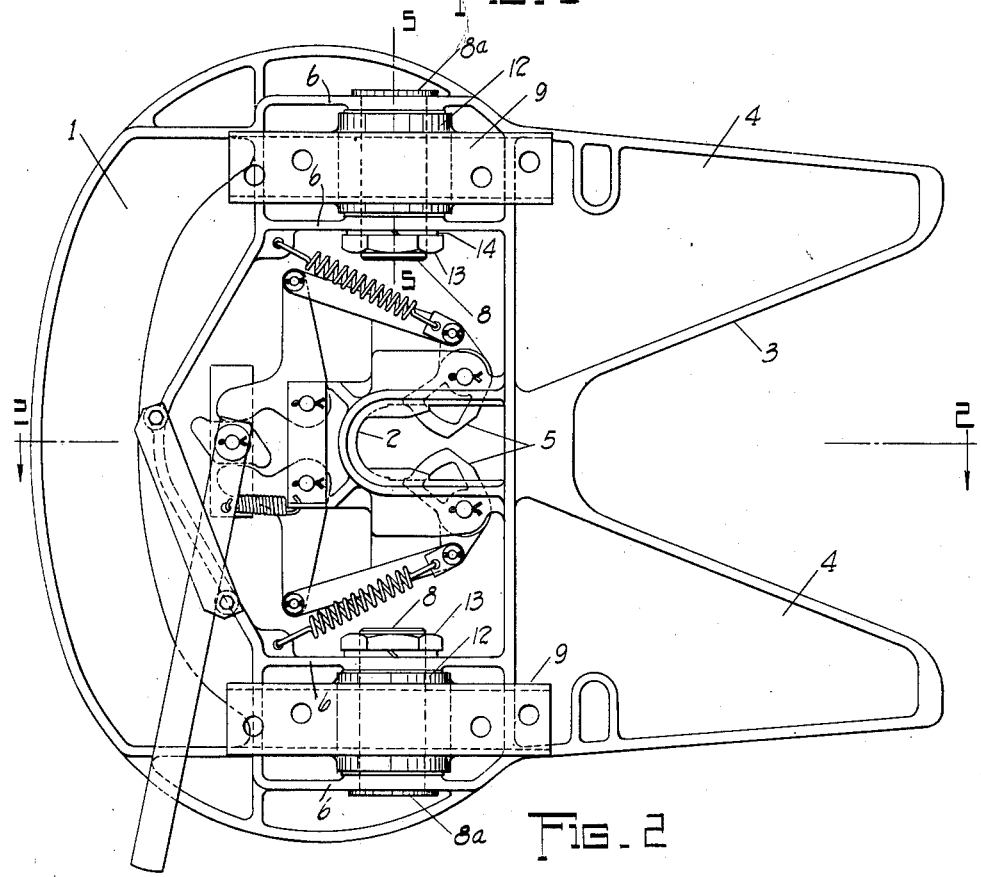
Figure 2 is a bottom plan view of a fifth wheel incorporating the general features of my invention involved primarily in the pivotal mounting means shown in the figure.

I first refer to Figures 1 and 2 of my drawings which illustrate the general construction of the tilting or rocking fifth wheel and the general mounting means therefor.

My fifth wheel comprises the usual platform or flat body portion 1, at the central portion of which is located the king pin slot socket 2 adapted to receive the king pin, not shown, on the front end portion of the trailer vehicle, not shown. The rear portion of my fifth wheel 1 is slotted longitudinally of the wheel, as shown at 3 to provide the usual tapering guide slot which guides the king pin as it moves into the socket 2 incident to the backing movement of the tractor carrying the fifth wheel and moving the latter rearwardly for engagement with said king pin, according to known practice. The formation of the rear end of my fifth wheel of course provides the rearwardly extending side or wing members 4 at opposite sides of the slot 3, which latter tapers toward the king pin socket 2, said wing members 4 on their upper surfaces being curved downwardly toward their rear extremities to facilitate the riding up of the front end of the trailer and the king pin fifth wheel plate thereon over the upper surface of the members 4 and on to the body of the fifth wheel.

My fifth wheel is illustrated as having a common type of locking mechanism including the latch members 5 for automatically engaging and locking the king pin in the socket 2 in the coupling operation between the trailer and the tractor, utilizing the fifth wheel means as the coupling device. Since the locking mechanism shown may be of any of different types in common use and said mechanism is no part of my present invention, it is not described in detail.

For the pivotal or rocking movement of the fifth wheel 1 upon the rear end of the chassis of the tractor vehicle I provide at opposite sides of the fifth wheel, see particularly Figures 2 and 5, opposite pairs of depending pivot arms or flanges 6. Each pair of the pivot arms 6 is formed with concentric openings for receiving a pivot member in the form of a pivot bolt 8 later to be more fully described. The concentric openings in each pair of the flanges or pivot arms 6 are in alignment transversely of the fifth wheel body 1 and approximately centrally between the front and rear ends of the latter.

It is characteristic of my construction of the fifth wheel body 1 with the integral depending flanges or pivot arms 6 projecting from the underside thereof, that the said flanges or arms 6 at each side of the fifth wheel body may be moved slightly toward each other by the inherent resiliency of the metal from which the fifth wheel is constructed, when proper pressure is exerted at the outer sides of each pair of members 6, to accomplish the above mentioned results.

For connecting the pivot members 6 with the chassis of the tractor on which the fifth wheel is mounted, I utilize the bolt 8 previously referred to, and brackets 9 which are bolted as shown in Figure 1 by the bolts 10 to attachment plate 11 which is in turn to be bolted to the chassis of the vehicle.

The fifth wheel supporting brackets 9 each involve a simplified construction in that the bracket body is made of a U-shaped piece of metal suitably bent into form and the sides of said bracket are cut out with semi-circular recesses to receive a bearing sleeve 12 suitably welded to the sides of the bracket along the arcs of the cutouts so as to rigidly connect the parts 9 and 12 together. The sleeve 12 is really a short section of tubing and the construction illustrated is one of cheap form and yet of great strength. It is within the contemplation of my invention however that I might use a cast construction of bracket 9 with the bearing sleeve 12, if desired.

The internal diameter of the sleeve bearing 12 is considerably larger than the external diameter of the bolt 8, used in conjunction therewith to afford a pivotal connection between one side of the fifth wheel and the chassis attached plate 11 adjacent thereto, all for a special purpose. The bolt 8 comprises the head 8a at its outer portion, the opposite or inner end of the bolt being threaded to receive a suitable nut 13 between which and the adjacent one of the bearing flanges or arms 6 will be interposed a metal washer 14.

I come now to describe the special type of torsion bearing and connecting means intermediate each of the sleeve bearings 12 of the brackets 9, and the adjacent parts 6 to which the members 12 are connected.

My torsion bearing means comprises a bearing unit cooperative with each of the sleeves 12 of the brackets 9. Each bearing unit comprises an incompressible rubber bushing 15 which is interposed between an inner sleeve 16 engaging the inner periphery of said bushing, and an outer sleeve 17 engaging the outer periphery of said bushing. The inner sleeve 16 and the outer sleeve 17 are substantially of the same length, and of a length such that they will be received snugly between the depending bearing arms 6 at one side of the fifth wheel 1. In other words it is contemplated to provide only sufficient tolerance or clearance between the ends of the sleeves 16 and 17, and the inner faces of the pair of bearing arms 6, as to allow the insertion of the torsion bearing unit in the space between the part 6 of each pair of such parts. The length of each of the sleeves 16 may be slightly greater than the length of the associated sleeve 17 so that each sleeve 16 will just snugly or tightly fit between the members 6 with which it is associated.

Now in the production of each of the torsion bearing units which I have described as composed of the parts 15, 16 and 17 the rubber bushing 15 prior to insertion between members 16 and 17 is of relatively greater thickness than as shown in Figure 5. In other words it is in an enlarged form that might be characterized as a sort of "doughnut." This bushing 15 is forced by such great pressure into the space between the sleeves 16 and 17, when the latter are concentrically disposed, the sleeve 16 within the sleeve 17, that the rubber or resilient material of the bushing 15 is practically unified at its inner periphery to the sleeve 16, and at its outer periphery to the sleeve 17, by the tremendous pressure exerted by said bushing on the sleeves and the friction between the parts. Therefore when the parts of the torsion unit are assembled, the bushing 15 is substantially incompressible further, and when the torsion unit is in place between the members 6 as seen in Figure 5, the said incompressibility of the bushing 15 is maintained because there is no possibility of any flowing of the rubber or resilient material from which the bushing is made, once it is mounted with the torsion unit in the position shown in Figure 5, between the bearing arms 6. Under the foregoing conditions, there is no possibility of yielding of the bushing 15 in the space between the sleeves 16 and 17 under the loading of the bearing means with respect to the maximum shocks that may be received thereon incident to the coupling of the tractor vehicle carrying my fifth wheel, with the trailer vehicle to which said wheel is coupled, or under any of the maximum shocks that would be experienced in the ordinary travel movement of the trailer and tractor vehicles together, or shocks incident to the backing of the trailer against a dock where it is to be unloaded.

I now describe the manner in which a torsion bushing unit for each of the sleeve bearings 12 is connected thereto against relative rotation between the sleeve 12 and the sleeve 17 of the torsion unit. The torsion unit when the parts are assembled is forced into one of the bearings 12 by great pressure so as to obtain a tight immovable engagement between the parts 17 and 12. In other words a pressfit connection is thus established between the parts 17 and 12 so that the sleeve 17 cannot rotate within the bearing sleeve 12.

With the torsion unit for each pair of the bearing arms or flanges 6, mounted in the associated sleeve bearing 12 in the manner described, the fifth wheel 1 may be then placed in position supported by the brackets 9 so that the parts 12 and the torsion units associated therewith will be received between the pairs of bearing arms 6 depending from the fifth wheel. The bolts 8 may next be placed in position passing through the concentric aligned openings of the bearing arms 6, and through the sleeves 16 of the torsion bushing units.

With the parts arranged as above described the fifth wheel is inclined rearwardly in the position shown by dotted line in Figure 1 which is its normal position when uncoupled from the king pin of the trailer.

Thereupon the nuts 13 are screwed on the adjacent ends of the bolts 8 after placing the washers 14 in position, and tightened up sufficiently hard so as to cause the inner faces of each pair of the members 6 to engage the opposite ends of the inner sleeves 16 of the torsion units. When said opposite ends as shown in Figure 3 and the nuts are attached in the manner stated, the action of the bolts 8 of said nuts is to clamp the sleeves 16 of the two torsion units in non-movable engagement with the inner faces of the bearing arms 6, the latter yielding slightly by moving together under the pressure exerted by the tightening action of the nuts 13 and bolt heads 8a at the outer sides of the members 6.

With the above operations performed assembling the fifth wheel upon the brackets 9 and connecting the torsion bearing units parts 16 with the members 6, the parts 17 of the torsion units having previously been immovably connected to the sleeve bearings 12, the fifth wheel will be supported on the chassis in the inclined position shown in Figure 1 of my drawings. Bearing in mind that the outer periphery of the rubber bushings 15 of the torsion bearings units are fixed to the bearing members or sleeves 12, and the inner peripheral portions of the rubber members 15 are fixed to the sleeves 16 which in turn are fixed against rotation to the bearing arms 6, the only way in which the rear end of the fifth wheel may move upwardly from the dotted line position of Figure 1, or rock, is by placing the outer peripheral portion of the rubber bushings 15 under rotary torque moving these portions of the parts 15 relatively to the stationary inner peripheral portions of said bushings 15 that are held stationary by their permanent connection to the sleeves 16 which in turn are held stationary by their engagement at their ends with the depending bearing arms 6. Thus the normal action of the torsion bearing units is to maintain the fifth wheel in the dotted line position of Figure 1 in which its rear end is downwardly inclined, this being the safety position of the fifth wheel under all conditions incident to the requirements of coupling same by rearward movement of the tractor carrying the fifth wheel 1 underneath the front end of the trailer, and the king pin coupling operation.

Now in the use of fifth wheels of the type shown in the drawings, the same generally being a standard type, the fifth wheel 1 at its rear end will travel through an arc of approximately twenty-five and one-half degrees incident to the operation thereof from the time when the trailer is first picked up by backing the tractor and fifth wheel into coupling connection therewith, and operated under the possible varying road conditions causing a forward downward tilting of the fifth wheel, as well as a rearward downward movement, in the travel of the vehicles. In other words the fifth wheel rotates downwards at the rear approximately sixteen and a half degrees, and it rotates downwards at the front approximately nine degrees. Therefore it is to be understood that when the fifth wheel has been mounted in place upon the bearing brackets 9—12 of the chassis of the tractor the torsion bearing units being tightened up or adjusted in the manner above described, said bearing units will hold the rear end of the fifth wheel in the downwardly inclined position of Figure 1 by dotted line illustration, or about sixteen and one-half degrees below the horizontal line. As stated above the entire rocking movement of the fifth wheel will be approximately twenty-five and one-half degrees considering both the rearward downward movement and the forward downward movement, and the torsion bearing units will permit of such rocking incident to the rotative torque movement of the outer peripheral portions of the bushings 15.

It will be apparent from the foregoing that by the use of my torsion bearing units assembled in the rocker bearings for the fifth wheel 1, I obtain a simplified construction of means for normally maintaining the fifth wheel in its safety downwardly and rearwardly inclined position under all practical conditions, when the fifth wheel is uncoupled from the trailer vehicle. If in the travel of the tractor vehicle separate from the trailer vehicle the vibration or jarring of the fifth wheel 1 is such as to tend to move its rearward end upwardly, the torsion action of the bushings 15 will promptly restore the rear end of the wheel to the inclined position of the dotted lines of Figure 1.

Under the foregoing conditions of construction of my invention it is apparent that I do not need to employ heavy rearwardly extending wings 4 as a part of my fifth wheel construction, in order to normally overbalance the fifth wheel in a rearward downward direction as required for its position when uncoupled from the trailer. This enables me to build my fifth wheel much lighter in its metallic structure than is possible with most of the fifth wheels now in use. In addition to the foregoing, I do not need to employ special springs or equivalent means for exerting a downpull on the rear end of the fifth wheel to maintain it in its downwardly and rearwardly inclined position, when uncoupled.

It is obvious from the foregoing that I utilize the torsion bearing units described solely for their normal torsion exerting effect upon the fifth wheel to hold it in the position of downward inclination when uncoupled from the trailer. The rubber or resilient material of the bushings 15 being incompressible, and so combined that it is not possible for it to flow in any direction, affords no cushioning effect whatsoever for shock absorbing function, in the practical use of my invention.

To increase the gripping fixing engagement of the ends of each sleeve member 16 with the inner faces of adjacent pivot brackets 6, the said ends of the sleeves 16 are serrated as shown at 16a.

Having thus described my invention, what I claim as new and desire to secure by Letters Patent of the United States, is:

In fifth wheel construction, a fifth wheel having a split king-pin guiding rear end and a king pin socket, king-pin coupling means on the wheel and means to mount the fifth wheel on a tractor vehicle chassis including pairs of spaced apertured bearing members on the under sides of the wheel, supporting brackets attachable to a vehicle chassis and each including a sleeve bearing member to enter between the spaced bearing members of an adjacent pair, a pivot connection between each pair of apertured bearing members and the associated sleeve bearing member, and a torsion unit surrounding each pivot connection, said unit including a torsion sleeve fixed to the adjacent pair of apertured bearing members, a second torsion sleeve fixed to the adjacent sleeve bearing member and a rubber bushing fixed to the first torsion sleeve and also fixed to the second torsion sleeve and stressed so as to be under torsion to move the rear end of the wheel downwardly when the wheel is horizontally disposed, in which the rubber bushing surrounds the pivot connection and is located between the adjacent two torsion sleeves and also in which the pivot connections each include a headed bolt and a nut screwed on the bolt to compressibly clamp each pair of spaced apertured bearing members against the torsion sleeve to which it is fixed to rigidly connect these parts.

JAMES STEPHEN.

REFERENCES CITED

The following references are of record in the file of this patent:

UNITED STATES PATENTS

| Number | Name | Date |
| --- | --- | --- |
| 2,263,114 | Winn | Nov. 18, 1941 |
| 2,353,267 | Reid | July 11, 1944 |
| 2,359,499 | Walther et al. | Oct. 3, 1944 |